United States Patent [19]

McCoy

[11] Patent Number: 4,502,280
[45] Date of Patent: Mar. 5, 1985

[54] HYDRAULIC APPLICATIONS

[76] Inventor: Walter T. McCoy, 4034 McKay Creek Dr., Clearwater, Fla. 33540

[21] Appl. No.: 364,440

[22] Filed: Apr. 1, 1982

[51] Int. Cl.³ .............................. F01B 19/04; F16J 3/04
[52] U.S. Cl. ........................................ 60/567; 60/581; 92/37; 92/48; 92/64; 92/90
[58] Field of Search ................... 92/89, 90, 91, 92, 93, 92/64, 37, 39, 48; 60/325, 567, 581

[56] References Cited

U.S. PATENT DOCUMENTS

| 2,392,279 | 1/1946 | Woods | 92/90 |
| 2,642,091 | 6/1953 | Morin | 92/90 |
| 2,844,126 | 7/1958 | Gaylord | 92/90 |
| 3,013,392 | 12/1961 | Falge et al. | 60/567 |
| 3,063,620 | 11/1962 | Black | 92/90 |
| 3,202,061 | 8/1965 | Johnson | 92/64 |
| 3,561,330 | 2/1971 | Rich | 92/92 |
| 3,601,442 | 8/1971 | Orndorff, Jr. | 92/92 |

Primary Examiner—Paul E. Maslousky
Attorney, Agent, or Firm—Ronald E. Smith

[57] ABSTRACT

An apparatus that controls movement of an arm through a gaseous or liquid fluid. The apparatus incorporates a plurality of longitudinally extensible hose members that expand and contract their respective lengths responsive to introduction and withdrawal, respectively, of hydraulic fluid thereinto and therefrom. The hose members are interconnected to one another through a plurality of longitudinally spaced, transversely disposed brace members that may serve as lever means so that expansion or contraction of one hose member can effect an opposite response in an opposed member. The brace members may be interconnected by a spine means that coincides with the longitudinal axis of symmetry of the apparatus. A sheath covers the apparatus. The arm has applications in the field of robotics and a special rat tail-like form of the apparatus provides a low drag substitute for conventional aircraft rudder and elevator assemblies.

4 Claims, 13 Drawing Figures fig. 8
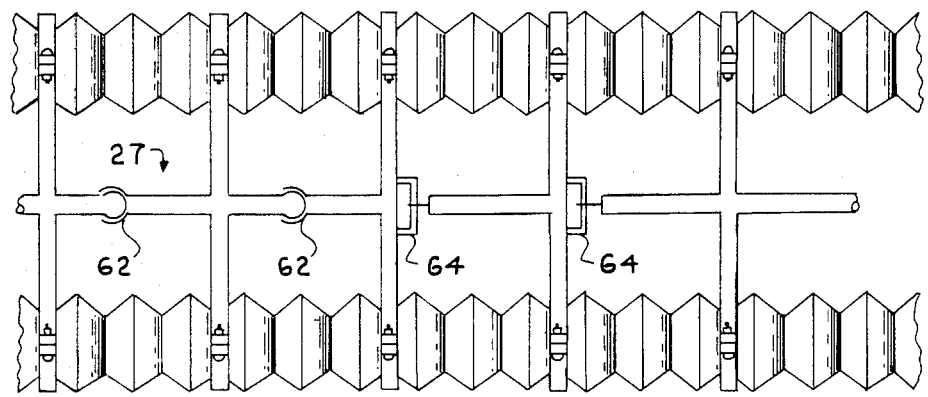
fig. 9
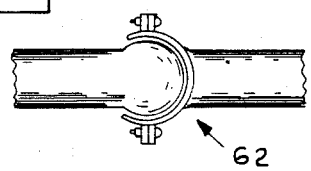
fig. 10
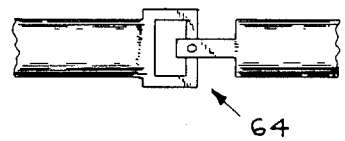
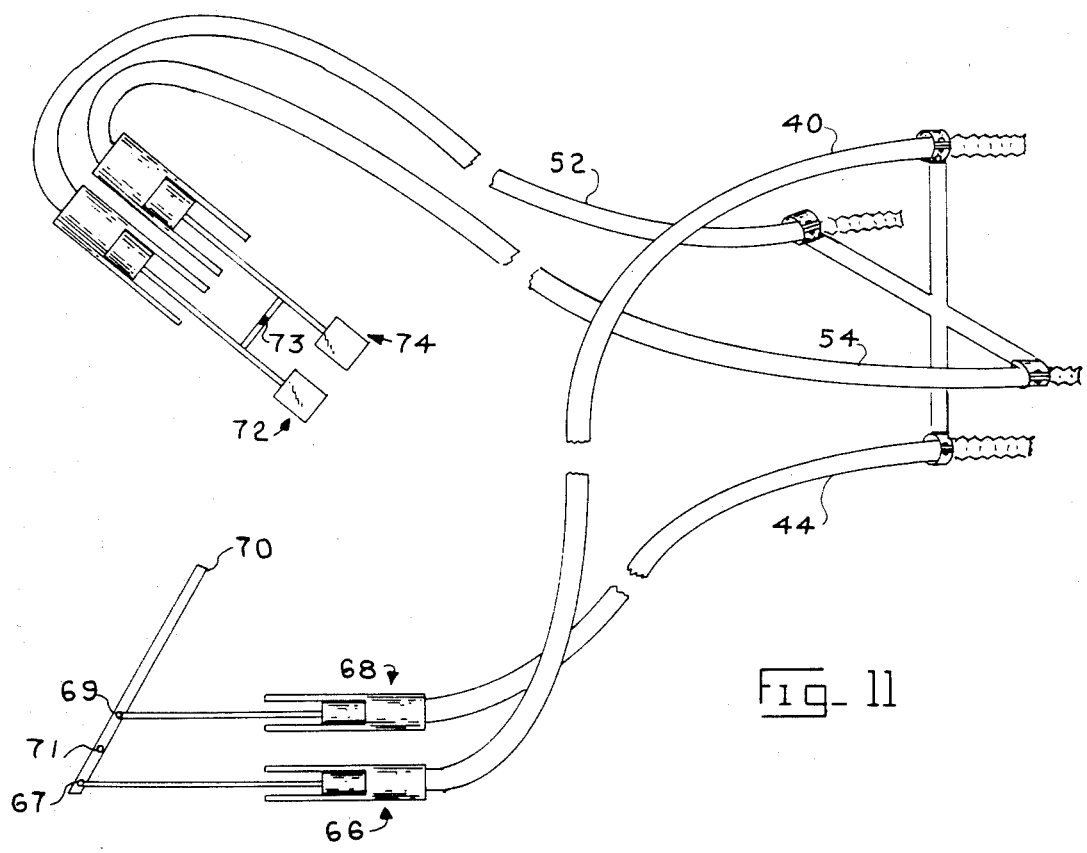
fig. 11

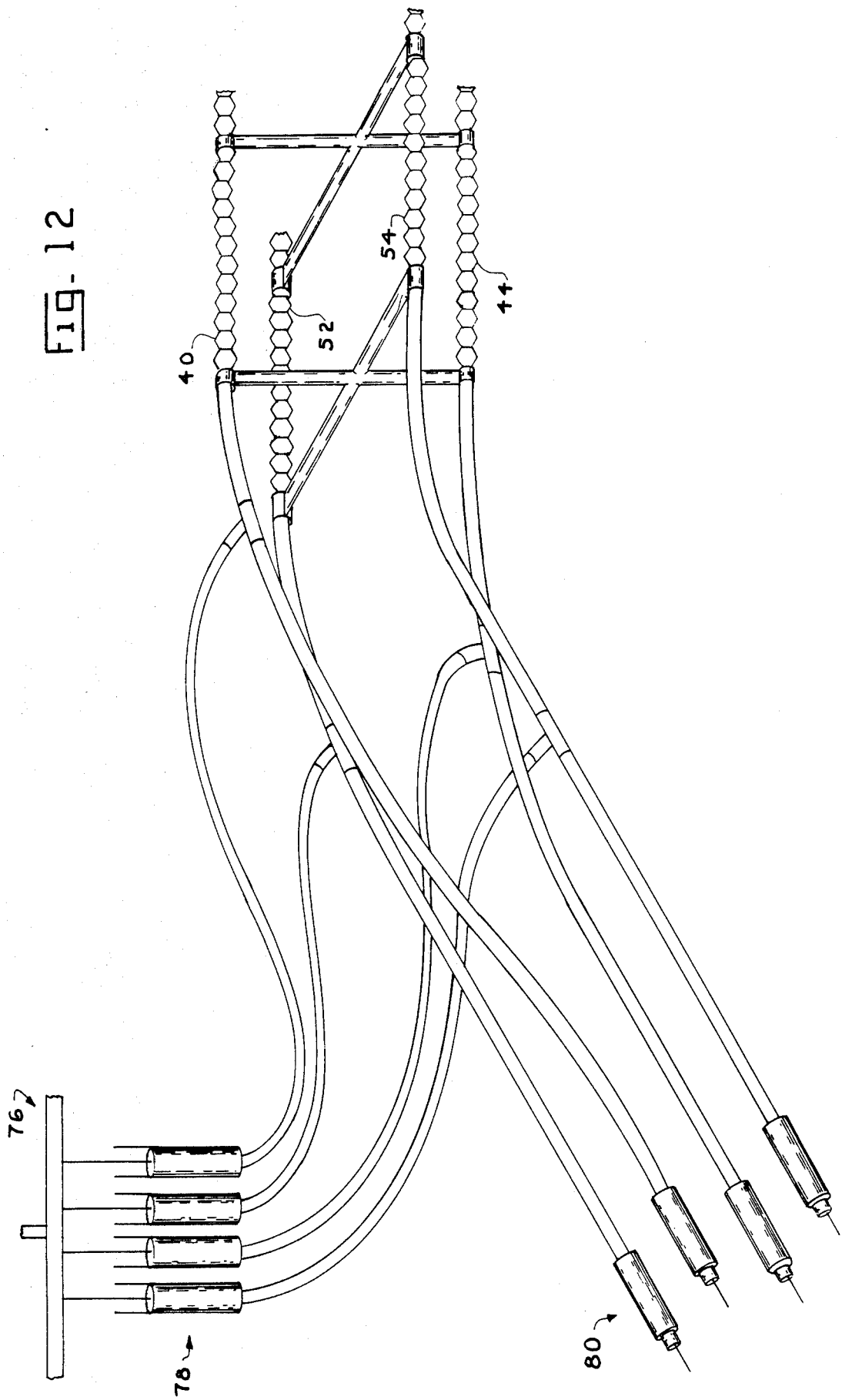

FIG_13
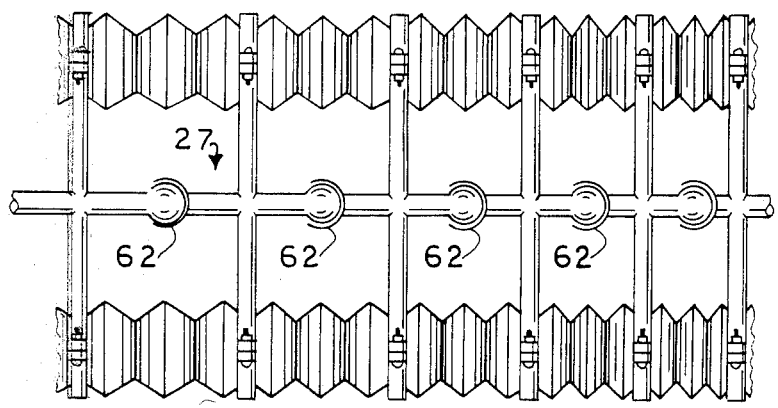

HYDRAULIC APPLICATIONS

BACKGROUND OF THE INVENTION

1. Field of the Invention

This invention relates, generally, to hydraulic fluid devices, and more particularly to an elongate arm of either uniform or progressively diminishing transverse cross sectional area, the movement of such arm being controlled by the introduction or withdrawal of hydraulic fluid into or out of predetermined ones of flexible hose members that are incorporated into the arm.

2. Description of the Prior Art

A search of United States patents that was conducted before the filing of this disclosure found the following patents:

| Patentee | U.S. Pat. No. | Date of Issue |
|---|---|---|
| Hafner | 3,007,176 | 11-07-61 |
| Templin | 3,198,031 | 08-03-65 |
| Kleinwachter | 3,638,536 | 02-01-72 |
| Ewing | 3,713,685 | 01-30-73 |
| Andorf | 3,981,528 | 09-21-76 |

The search covered Class/subclass 3/1.2, 294/86,99, 244/51,78.

Clearly, the prior art does not provide or suggest a mechanism of the type disclosed hereinafter.

SUMMARY OF THE INVENTION

A flexible, longitudinally extensible hose member that is capped at one end will expand along its length if a fluid such as hydraulic fluid is introduced at its open end. Withdrawal of the fluid from the capped hose member will allow it to contract along its length. The amount of extension or contraction is proportional to the amount of fluid introduced or withdrawn from the hose. If a plurality of such hoses are disposed in substantial parallelism to one another and interconnected at longitudinally spaced intervals by a plurality of transversely disposed brace members, the entire assembly will lengthen or shorten as hydraulic fluid is introduced into or withdrawn from the respective hoses. If the hose members have the same length and the same transverse cross sectional area, and if equal amounts of fluid are introduced or withdrawn from the respective hoses simultaneously, then the hoses will expand and contract as a unit. If fluid is added to a preselected hose and withdrawn from an oppositely disposed hose, then the assembly will warp, or curl. Enclosing the entire assembly with a flexible covering or sheath can provide an arm the motion of which is hydraulically controllable. Not only could such an arm extend and contract along its longitudinal axis of symmetry, but such an arm could also bend in any manner. The tip of the arm could be made to describe a circle, for example, there being virtually no limitation on the capabilities of the arm to assume different configurations.

Such an arm would have obvious utility in the field of robotics. However, if the arm were built to taper toward its closed end, thereby defining a rat tail-like configuration, then such an arm could conceivably be used to control the motion of an aircraft through the atmosphere, replacing the high drag, fuel consuming rudders and elevators now in use.

A primary object of this invention is to provide a robot arm formed primarily of flexible hose members that are manipulated by the introduction thereinto or withdrawal therefrom of hydraulic, or other suitable, fluid.

A closely related object is to provide a robot arm that is of simple construction vis a vis conventional robot arm constructions, so that the cost of providing such arms is substantially reduced.

Another object is to demonstrate how such an arm, in modified form, could be employed in the context of aircraft control mechanisms.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 8 shows an embodiment that has a spine that is provided with universal or ball and socket joints.

FIG. 9 is a detailed side elevational view of a ball and socket joint of the type shown in FIG. 8.

FIG. 10 is a detailed side elevational view of a universal joint of the type shown in FIG. 8.

FIG. 11 is a perspective view that shows how the respective ones of the hose members are operably connected to aircraft control mechanisms to accomplish climbing, descending and turning of an aircraft such as shown in FIGS. 1-3, in the absence of elevators and rudders.

FIG. 12 is a perspective view showing how one set of controls can be employed to lengthen and shorten the hoses and hence the assembly, while another set of controls can be employed to effect curvature of the assembly.

FIG. 13 shows an embodiment similar to that of FIG. 8, wherein the respective lengths of the spine segments are progressively shortened.

DETAILED DESCRIPTION OF THE PREFERRED EMBODIMENT

Figure 1:
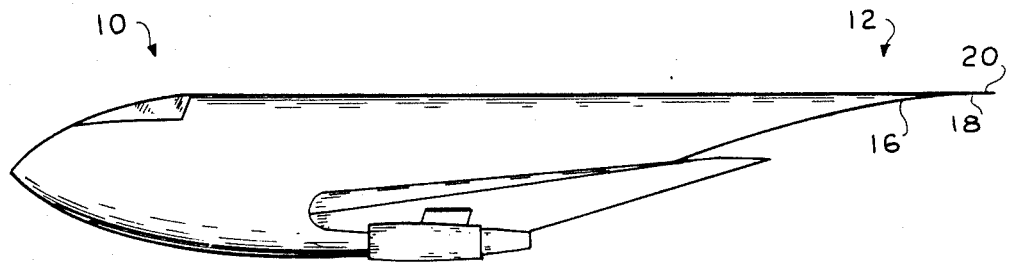
FIG. 1 is a side elevational view of an otherwise conventional aircraft that has been provided with one form of the inventive assembly in lieu of the conventional rudder and elevator.
Figure 2:
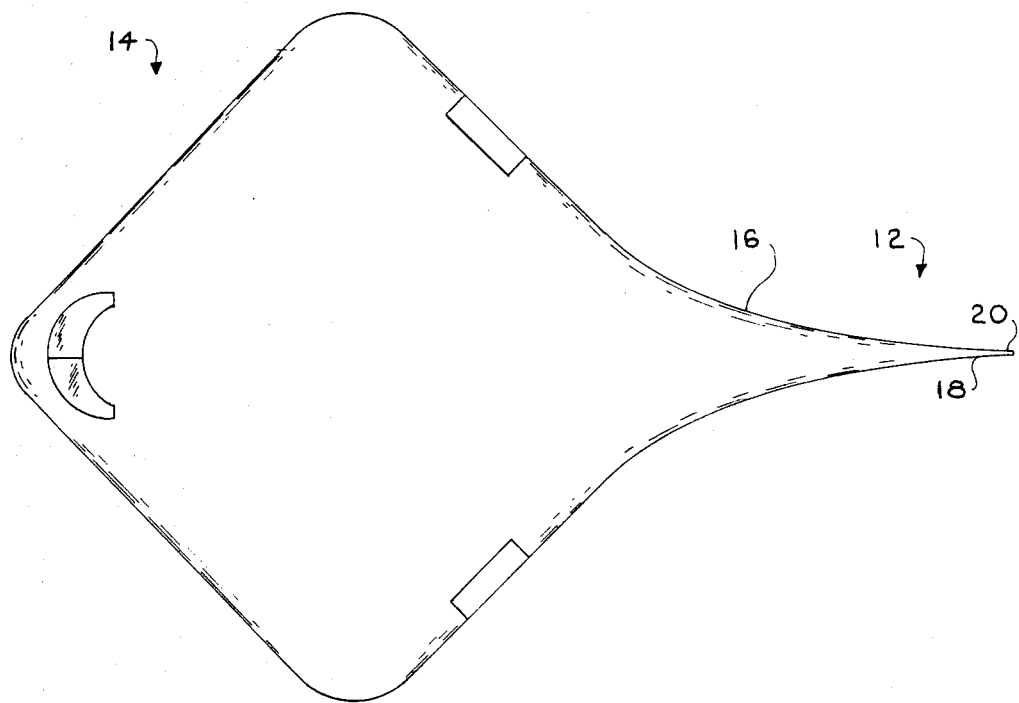
FIG. 2 is a top plan view of an aircraft of unconventional design that has been provided with the tail assembly shown in FIG. 1.
Figure 3:
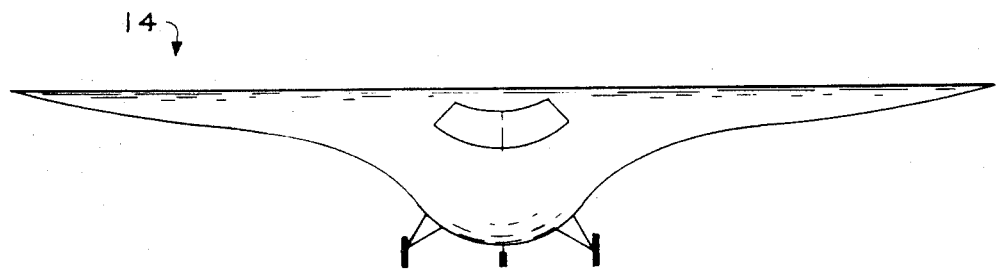
FIG. 3 is a front elevational view of the aircraft shown in FIG. 2.

Referring now to FIGS. 1, 2 and 3, different types of aircraft demonstrating one application of the novel concept are shown. FIG. 1 shows an otherwise conventional aircraft, designated 10 as a whole, that has been modified to have the inventive tail assembly, generally designated 12, in lieu of the conventional rudder and tail assemblies.

FIGS. 2 and 3 show an unconventionally shaped aircraft, generally designated 14 as a whole, also having the inventive tail assembly 12.

As is shown in FIGS. 1 and 2, the tail portion 12, whether it forms a part of a conventional or unconventional craft 10 or 14 has a rat tail-like configuration. More specifically, the tail 12 has a circular transverse cross section throughout its length, and the diameter of the cross section progressively diminishes from the forward portion 16 of the tail to the rearward portion 18 of the tail. The trailing tip 20 of the tail 12 is pointed.

Those familiar with the appearance of the marine animals commonly called Manta Rays will note the similarity of appearance between such animal and the aircraft depicted in FIGS. 2 and 3. The Manta Ray effectively steers itself through water by manipulating its tail. Thus, if the Ray desires to swim toward the surface, it curls its tail upwardly with the slope of the curve increasing from its body to the tip of its tail. The curl is formed in a reverse direction if the Ray desires to increase its depth. Similarly, a leftward curl of the tail enables the Ray to turn left, and an opposite curl enables travel to the right. An observer of a Ray will note that the Ray executes turns in all directions and executes all degrees of turns, from gentle turns to sharp turns. Clearly, a rat tail-like member can be employed to effect maneuvering of a craft through a fluid, whether the fluid is a liquid such as water or a gas such as the atmosphere.

The use of a Manta Ray-like tail on an aircraft would increase the fuel efficiency of the craft by eliminating the fuel-consuming drag produced by conventional tail assemblies. Maneuverability would not be sacrificed, and most likely would be enhanced. A flexible metal would be required to cover a tail assembly incorporating the novel concept. Preferably, a mail-like, but light weight covering would be employed, although those skilled in the art of metallurgy or the art of materials in general could perhaps provide more suitable materials now that the concept calling for such materials has been disclosed.

The balance of this disclosure will concentrate primarily on the apparatus required to effect the desired curling of the tail assembly 12. Also, a variation of such assembly having application in the context of robotics will be disclosed.

Figure 4:
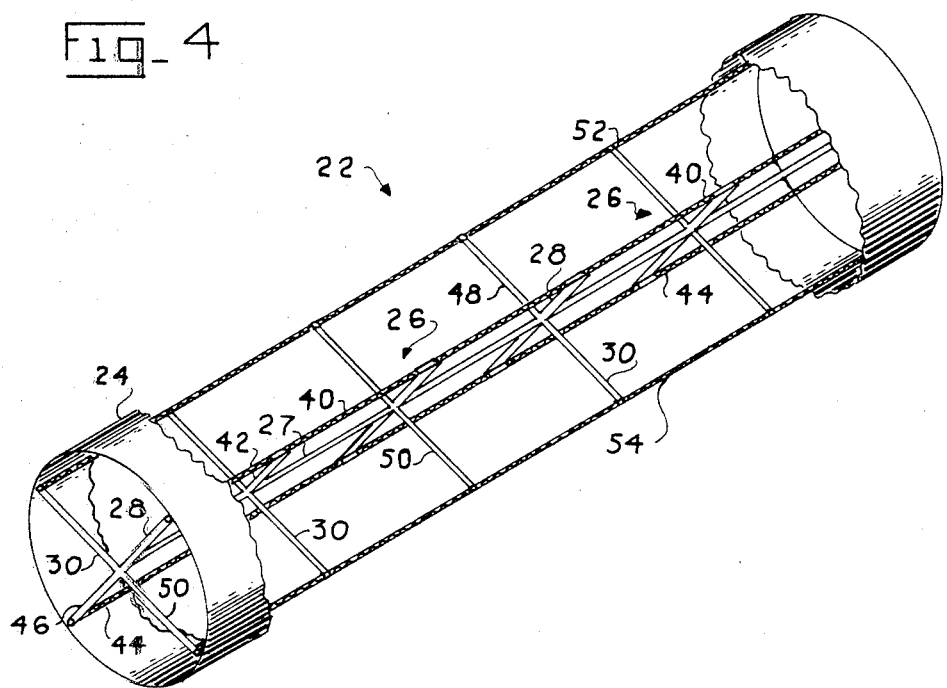
FIG. 4 is a partially broken away perspective view of an assembly of flexible hose members that are interconnected by transversely disposed brace members that are in turn interconnected by a spine member the position of which coincides with the longitudinal axis of symmetry of the assembly.

Referring now to FIG. 4, a section of a Manta Ray or rat tail-like assembly 12 is shown. The section shown is designated 22 and is of uniform transverse section throughout its length, for ease of illustration purposes. The metallic or other suitable flexible material that forms the outer covering of the tail section 22 is designated 24, and the covering has been broken away to show the interior structure of the section 22.

The interior structure, shown diagrammatically in FIG. 4, includes a plurality of longitudinally spaced bracing members, collectively and generally designated 26. The braces 26 more specifically include integrally formed, vertically aligned brace members 28 and integrally formed, horizontally aligned brace members 30. The brace members 26 are interconnected by a centrally disposed, longitudinally aligned spine member 27. Details of the spine member 27 are omitted from FIG. 4 to simplify the drawing, but the omitted details are shown and described in connection with FIG. 8, infra.

Figure 5:
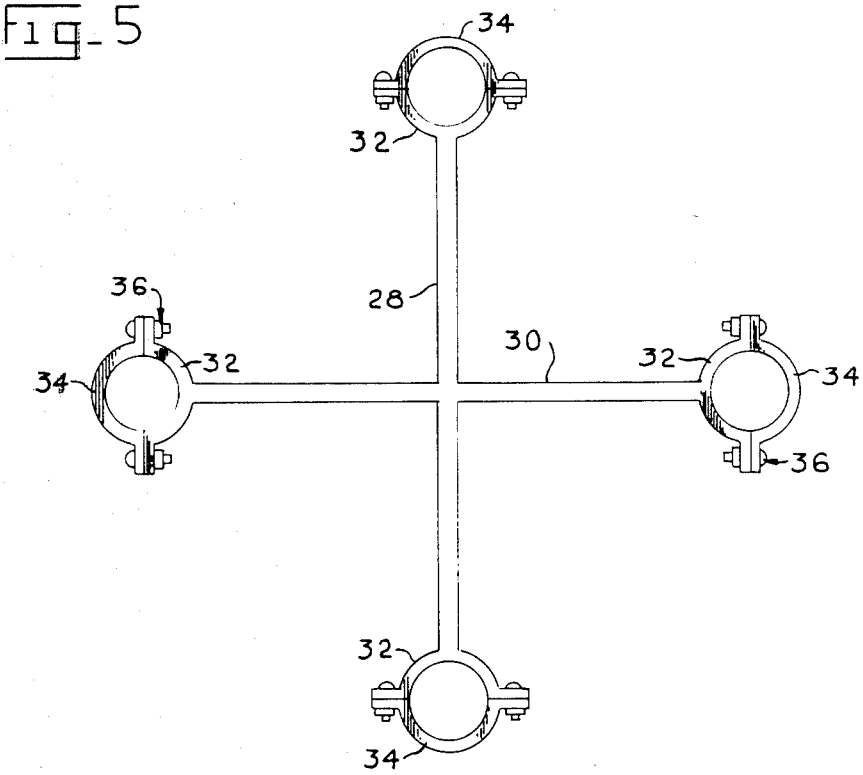
FIG. 5 is a front elevational view of the brace members shown in FIG. 4.

As is clearly shown in FIG. 5, each brace 28, 30 terminates at its respective opposed ends with a semicircular end portion 32 that forms a base means for a complementally formed semicircular clamping member 34 that is releasably secured thereto by conventional nut and bolt assemblies 36.

Figure 6:
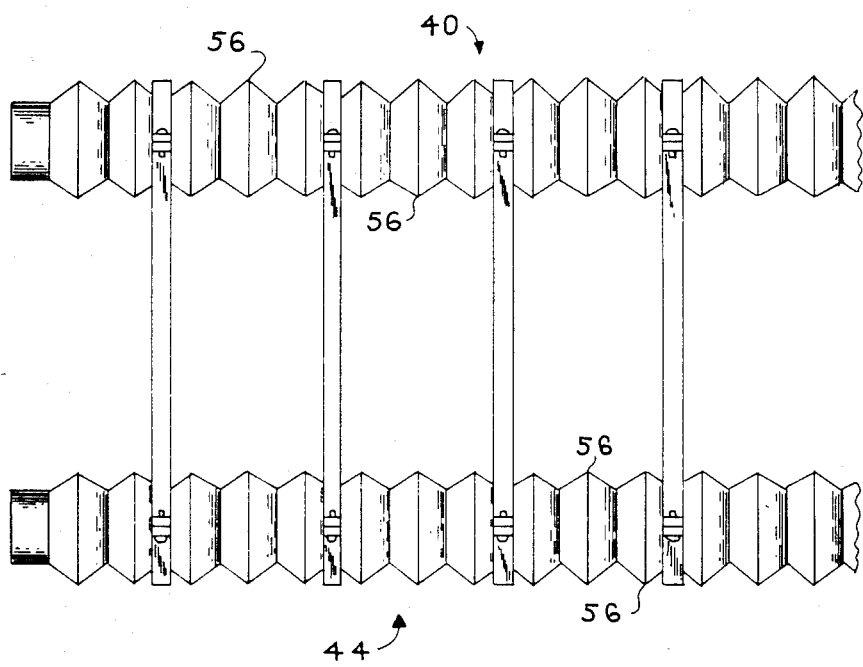
FIG. 6 is a side elevational view that omits the spine member shown in FIG. 4, showing the flexible nature of the hose members and the manner in which the brace members engage the hose members at longitudinally spaced intervals.

The clamping assemblies 32, 34 are provided to clampingly engage longitudinally and equidistantly spaced portions of a plurality of longitudinally disposed flexible hose members 40, 44, 52 and 54 indicated in FIG. 4. The hoses 40, 44, 52 and 54 are of the type adapted to receive hydraulic fluid therein along the respective lengths thereof. The introduction of hydraulic fluid-not shown-into top hose 40 will cause it to elongate due to its corrugated construction as shown in FIGS. 6, 8 and 12. The respective upper halves 42 of upstanding braces 28 will accordingly collectively diverge, longitudinally, from one another. The simultaneous withdrawal of hydraulic fluid from lower hose 44 will cause that hose to contract along its length due to its corrugated, or accordion-like structure, so that the respective lower halves 46 of braces 28 will mutually converge. In that braces 28 are integrally formed, as aforesaid, if the means for withdrawing fluid from hose 44 fails, the leverage exerted upon hose 44 by the diverging upper brace portions 42 will nevertheless impart convergence to the lower brace portions 46. Thus, the rigidity of brace members 28 constitutes a back up system, in effect. The converse is also true, of course, i.e., if the means for introducing hydraulic fluid-or other suitable fluid-into upper hose 40 fails, then the rigidity of brace members 28 will impart divergence or convergence to the respective upper brace portions 42 attendant convergence or divergence, respectively, of lower brace portions 46.

Horizontal brace members 30, (see FIG. 4) having portions 48 and 50, operate upon hoses 52 and 54, respectively, in the same manner, responsive to introduction into and withdrawal of hydraulic fluid from said hoses 52, 54.

Climbing, descending and turning are thus effected by manipulation of controls, shown and described hereinafter, that elongate and contract predetermined ones of the hoses 40, 44, 52 and 54.

FIG. 6 shows hoses 40 and 44 in side elevation and in detail so that the flexible nature of such hoses is shown. Hoses 52 and 54 are of identical construction. Elongation of the hoses is effected attendant flattening of peaks 56, and contraction is effected attendant steepening of such peaks 56.

The spine member 27 does not appear in FIG. 6, since in some applications such spine member 27 may not be desired. The absence of the spine 27 will reduce but not negate the leverage aspect of the brace members 28, 30. Accordingly, the assembly shown in FIG. 6 would have limited utility in aircraft maneuvering applications, but would have utility in the context of robotics, for example. A robot arm having the assembly of FIG. 6 could be employed in applications requiring an extensible and retractible arm.

Figure 7:
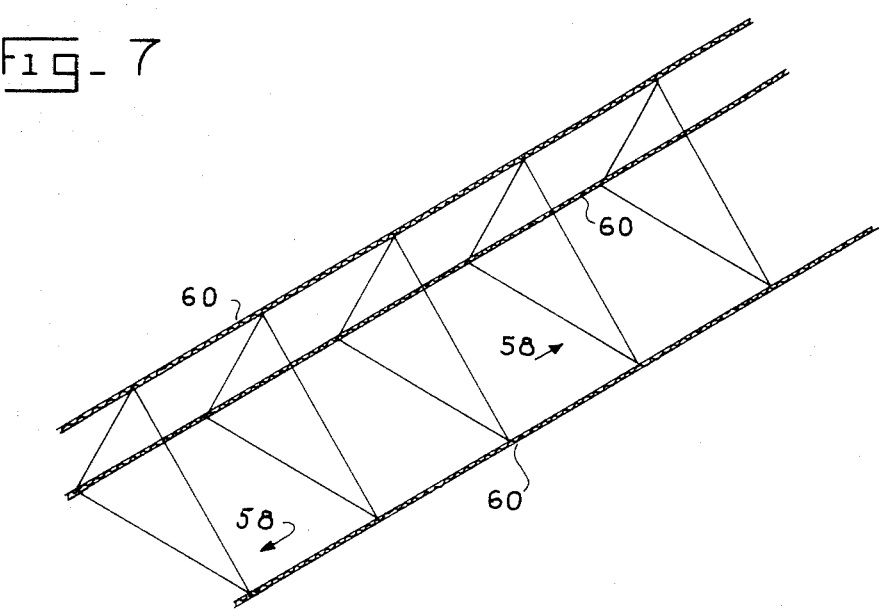
FIG. 7 is a perspective view of an embodiment that incorporates only three flexible hose members and does not employ a spine.

Another robotic environment assembly is shown in FIG. 7. No spine assembly is present in the assembly of FIG. 7, so the brace members 58 do not function as levers and no back up system is provided should the means for introducing or withdrawing fluid into or out of the hoses 60 fail. The absence of a back up system is of little consequence in robotic, land-based applications.

FIG. 8 shows that the spine shown generally in FIG. 4 is segmented, and that the axially aligned segments are pivotally connected to one another by either ball and socket joints as at 62, or by universal joints as at 64. Details of the respective assemblies 62, 64 are shown in FIGS. 9 and 10, respectively. Such pivotal connection allows the tail assembly 12 to assume its different curved configurations. To achieve exponential curvature of the tail assembly 12 from its forward portion 16 to its rearward portion 18, as shown in FIGS. 1 and 2, the spine segments would be provided in successively shorter lengths as the tip 20 of the tail 12 is approached, as shown in FIG. 13. The shorter segments would exaggerate the amount of curvature imparted to the tail 12, and the amount of exaggeration or amplification would be preselected by predetermining the respective lengths of the spine segments. Shorter braces 26 would accomplish the same effect.

One means for manipulating the amount of hydraulic fluid admitted into or withdrawn from the respective hoses 40, 44, 52 and 54 is depicted in FIG. 11. Ascension of an aircraft provided with the novel tail 12 is controlled by introduction of fluid into hose 44, coupled with withdrawal of fluid from hose 40. The fluid is pumped into and out of hose 40 by piston 66, and is pumped into and out of hose 44 by piston 68. Since each hose must elongate or contract reciprocally in relation to its opposed hose, pistons 66 and 68 are operatively mounted as at 67 and 69, respectively, on opposite sides of the pivotal mount 71 of a joystick 70. Thus, pushing forward on the control mechanism 70 will effect contraction and expansion, respectively, of hoses 44 and 40, to thereby effect descension of the aircraft 10 or 14. Pulling the stick 70 rearwardly will effect contraction and expansion, respectively, of hoses 40 and 44, thereby effecting ascension of the craft.

As is also shown in FIG. 11, lateral movement of an aircraft is controlled by manipulation of rudder pedals 72 and 74. A leftward turn is effected by depression of pedal 72 and a concomitant—due to pivot point 73—lifting of pedal 74, since such depression will effect expansion of hose 52 and contraction of hose 54. Depression of pedal 74 and lifting of pedal 72 will turn the craft toward the right. Of course, as in the context of conventional craft, movements in other than a perfectly vertical or horizontal plane are effected by manipulating the stick 70 and the pedals 72 and 74 in conjunction with one another.

FIG. 12 shows a means 76 that provides equal amounts of fluid to the hoses 40, 44, 52 and 54 via pistons 78. In this manner, extension and contraction of the hose members is accomplished independent of the means for effecting curvature in the hose assembly. Pistons 80 are thus exclusively committed to the task of effecting the desired curvature in the assembly. Of course, the function of the pistons 78 and 80 could be easily combined into one computer-assisted mechanism, it being understood that separate controls are shown for the separate functions in FIG. 12 to better explain the inventive concept.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

That which is claimed is:

1. An apparatus for controlling movement of an elongate arm through a fluid, comprising, in combination,
   a plurality of elongate flexible and longitudinally extensible hose members of the type adapted to receive hydraulic fluid therein,
   said hose members disposed in substantial parallelism relative to one another, and in circumferential relation to one another about a common longitudinal axis of symmetry,
   a plurality of longitudinally spaced brace members adapted to engage said hose members at longitudinally spaced intervals thereof, so that extension or contraction of said hose members effects divergence and convergence, respectively, of said brace members, relative to one another,
   an articulated, elongate spine member interconnecting said brace members, said spine member disposed substantially coincident with said common longitudinal axis of symmetry,
   means for independently introducing or withdrawing hydraulic fluid into and out of said hose members, respectively, so that a curvature can be introduced into said arm attendant introduction and withdrawal of unequal amounts of hydraulic fluid into and out of different ones of said hose members,
   said plurality of hose members being four in number, and each of said brace members having two substantially equal in length brace portions arrayed in orthogonal relation to one another such that their respective mid sections cross at the longitudinal axis of symmetry of the apparatus.

2. The apparatus of claim 1, wherein said means for independently introducing or withdrawing said hydraulic fluid into or from said hose members includes a first means for introducing like amounts of hydraulic fluid into each of said hose members on a substantially simultaneous basis, and further includes a second means for introducing and withdrawing unequal amounts of hydraulic fluid into and out of said hose members, said first means effecting longitudinal extension and retraction of said arm and said second means effecting curvature of said arm.

3. The apparatus of claim 1, wherein said hose members and brace members are housed within an elongate sheath member of flexible construction.

4. The apparatus of claim 3, wherein the transverse cross sectional area of said apparatus is uniform throughout its length.

* * * * *